(12) United States Patent
Alff (10) Patent No.: US 11,999,204 B2
(45) Date of Patent: *Jun. 4, 2024

(54) METHOD FOR OBTAINING THE DEFORMATION OF A TIRE UNDER LOAD DURING RUNNING

(71) Applicant: COMPAGNIE GENERALE DES ETABLISSEMENTS MICHELIN, Clermont-Ferrand (FR)

(72) Inventor: Denis Alff, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 408 days.

This patent is subject to a terminal disclaimer.

(21) Appl. No.: 17/416,872

(22) PCT Filed: Dec. 16, 2019

(86) PCT No.: PCT/FR2019/053090
§ 371 (c)(1),
(2) Date: Jun. 21, 2021

(87) PCT Pub. No.: WO2020/128277
PCT Pub. Date: Jun. 25, 2020

(65) Prior Publication Data
US 2022/0080789 A1    Mar. 17, 2022

(30) Foreign Application Priority Data

Dec. 21, 2018 (FR) ........................ 1873890
Jan. 30, 2019 (FR) ........................ 1900870

(51) Int. Cl.
*G05B 23/00*     (2006.01)
*B60C 23/06*     (2006.01)

(52) U.S. Cl.
CPC ................. *B60C 23/061* (2013.01)

(58) Field of Classification Search
CPC . B60C 23/061; B60C 11/246; G05B 23/0283; G05B 23/00
(Continued)

(56) References Cited

U.S. PATENT DOCUMENTS 6,142,026 A   11/2000   Ohashi et al.
8,024,087 B2   9/2011   Mancosu et al.
(Continued)

FOREIGN PATENT DOCUMENTS

DE    10 2011 000 556 A1   8/2012
WO    2006/034731 A1       4/2006
(Continued)

OTHER PUBLICATIONS

International Search Report dated Feb. 18, 2020, in corresponding PCT/FR2019/053090 (4 pages).

*Primary Examiner* — Shardul D Patel
(74) *Attorney, Agent, or Firm* — VENABLE LLP (57) ABSTRACT

A method for obtaining the deformation of a tire casing subjected to a load, rotating at a rotational speed W, comprises the following steps: acquiring a signal comprising the amplitude of the acceleration in the direction normal to the crown when running at the rotational speed W; delimiting the signal over a number of wheel revolutions, so as to construct a wheel revolution signal; determining a reference acceleration; defining a first energy density S which is a function of the wheel revolution signal, and of the reference acceleration, and which is denoted $S^+$ when the wheel revolution signal is above a threshold value A, or is denoted $S^-$ when the wheel revolution signal is below or equal to said threshold value A; and identifying the deformation gener-
(Continued)

ated by the load as a function of the reference acceleration and of the first energy density S.

15 Claims, 2 Drawing Sheets

(58) Field of Classification Search
USPC .......................................................... 701/29.4
See application file for complete search history.

(56) References Cited

U.S. PATENT DOCUMENTS

| | | |
|---|---|---|
| 10,882,366 B2 | 1/2021 | Kuchler |
| 11,067,431 B2 | 7/2021 | Cyllik et al. |
| 2007/0255510 A1* | 11/2007 | Mancosu ................ B60T 8/172 |
| | | 702/34 |
| 2008/0103659 A1* | 5/2008 | Mancosu ................ B60C 19/00 |
| | | 701/41 |
| 2018/0180463 A1 | 6/2018 | Cyllik et al. |
| 2019/0168550 A1* | 6/2019 | Kuchler .............. B60C 23/0464 |
| 2021/0199686 A1* | 7/2021 | Honda .................... G01P 15/08 |
| 2022/0080790 A1 | 3/2022 | Alff |
| 2023/0041164 A1 | 2/2023 | Alff |

FOREIGN PATENT DOCUMENTS

| | | |
|---|---|---|
| WO | 2017/032466 A1 | 3/2017 |
| WO | 2018/029320 A1 | 2/2018 |

\* cited by examiner

METHOD FOR OBTAINING THE DEFORMATION OF A TIRE UNDER LOAD DURING RUNNING

FIELD OF THE INVENTION

The present invention relates to methods for obtaining the deformation of a tyre casing of a wheel-tyre assembly subjected to load under running conditions.

TECHNOLOGICAL BACKGROUND

In the field of devices and methods for measuring the deformation of the wheel-tyre assembly, these devices and methods can be used to characterize the result of the deformation of the tyre casing caused by the applied load. Thus, the devices and methods seek to characterize mainly the footprint of the tyre on the ground, which is referred to as the contact patch. Specifically, the geometry or distribution of stresses within this contact patch are directly connected to the load applied to the tyre casing, possibly via the inflation pressure of the wheel-tyre assembly.

This contact patch, which represents only a minimal percentage of the periphery of the tyre casing in the inflated and mounted condition, is also highly sensitive to various parameters such as the macroroughness of the ground or unevennesses on the ground for example. Specifically, the true area of contact between the tyre casing and the ground may then correspond to the tops of the indenting features that characterize the macroroughness of the ground. This then modifies the distribution of the stresses in the tyre casing and may have an influence on the dimensions of the contact patch.

In addition, a precise determination of the dimensions of the contact patch is difficult to achieve under running conditions. Conventionally, during running, the contact patch is characterized using signals representative of the deformation of the tyre casing. These present a significant jump in the observed quantity, indicating the transition of the tyre casing from a free toroidal shape to a partially compressed toroidal shape with imposed movement. Specifically, the ground then constitutes a boundary condition of imposed movement type for the material points on the tyre casing. It is therefore difficult to identify the exact points of entry or of exit into/from the contact patch, especially since these vary slightly according to the nature of the ground. In addition, the contact patch represents only part of the development of the tyre casing, conventionally between $\frac{1}{20}$ and $\frac{1}{10}$ of the development of the tread. In order to obtain a precise picture of this portion of the tyre, it is necessary to employ a fine discretization of the deformation signal. This entails significant memory space, high spatial sampling frequencies, at least in the region of the contact patch, and taking measurements over numerous revolutions of the wheel in order to minimize the spread, already mentioned, associated with the ground, all of which consumes energy.

Prior art document WO2017/32466A1 is known and discloses a device for characterizing the load applied to a wheel-tyre assembly on the basis of an accelerometer mounted on the tyre.

SUMMARY OF THE INVENTION

The present invention relates to a method that allows precise evaluation of the deformation of the tyre casing under running conditions whatever the nature of the ground, while at the same time saving power in the measurement device.

DETAILED DESCRIPTION OF THE INVENTION

The invention relates to a method for obtaining the deformation of a tyre casing subjected to a load, in an inflated and laden state rotating at a rotational speed W. The tyre casing having a crown, two sidewalls and two beads of revolution about a natural axis of rotation and a median plane, the intersection between the median plane and the natural axis of rotation defines a wheel centre. The method comprises the following steps:
  fixing at least one sensor on the tyre casing in line with the crown at a radial position R with respect to the natural axis of rotation and able to generate at least one output signal proportional to the acceleration experienced by said sensor in the tyre casing;
  acquiring a first signal representing the amplitude of the acceleration in the direction normal to the crown when running at the rotational speed W;
  delimiting the first signal over a number $N^{TdR}$ of wheel revolutions, $N^{TdR}$ being greater than or equal to 1.0, $N^{TdR}$ being preferably a whole number, so as to construct a wheel revolution signal $\text{Sig}^{TdR}$;
  determining a reference acceleration $\gamma^{reference}$ that is a function of the rotational speed W and of the position of the at least one sensor;
  defining a first energy density S which is a function of the wheel revolution signal $\text{Sig}^{TdR}$, and of the reference acceleration $\gamma^{reference}$, and which is denoted $S^+$ when the wheel revolution signal is above a threshold value A, or is denoted $S^-$ when the wheel revolution signal is below or equal to said threshold value A;
  identifying the deformation of the tyre casing Def %, which deformation is generated by the load as a function of the reference acceleration $\gamma^{reference}$ and of the first energy density S which are associated with the position of the at least one sensor.

As in the prior art, it is necessary to obtain the acceleration of a material point on the tyre. In this instance, it is important for the acceleration to correspond to its component normal to the crown because it is this component that is the key piece of information regarding the deformation of the tyre casing. In addition, it is preferable for this to be the absolute acceleration of the material point and not merely its alternating component that alternates about the continuous component, as in certain methods of the prior art. However, if the acceleration delivered by the sensor does not comprise the continuous component, then this continuous component will need to be added artificially as being the centrifugal acceleration resulting from a radial position R and from a rotational speed W. As a preference, the radial position R of the sensor is determined with the wheel-tyre assembly in an inflated but unladen state. Next it is necessary to delimit the acceleration signal over a portion of a revolution of the wheel. It is important here, when delimiting the first signal, to be able to identify, either via the signal from the sensor, or from the first signal alone, or from a wheel revolution encoder, the number of revolutions of the wheel. Next, the rotational speed W is defined as being the mean rotational speed over the duration of the wheel revolution signal if the variation in rotational speed over the wheel revolution signal is small, namely represents less than 15% of the mean speed.

If the tyre casing is at constant speed, this is preferable because numerous potential error sources are eliminated.

Next, simply comparing the absolute level of acceleration from the wheel revolution signal against a reference acceleration connected with the radial position of the sensor and with the magnitude of the rotational speed W allows an energy density S to be generated. The amplitude of the wheel revolution signal with respect to a threshold value A which may, for example, simply be the reference acceleration, potentially generates a doublet, one positive and one negative, of deformation energy densities ($S^+$, $S^-$) from the wheel revolution signal. Thus, the method merely defines a tyre casing deformation energy density and allocates it between two subsets according to its position in relation to the threshold value A. These are operations that are simple to perform and consume little by way of resources. Of course, in order to be representative, the method starts from the absolute acceleration, allowing an easy comparison with the reference acceleration in order to identify the energy densities doublet.

Finally, the method determines the deformation of the tyre casing as a function of the calculated energy density which it normalizes over the duration of the wheel revolution signal that would experience a reference acceleration. Thus, the deformation represents a normalization of the deformation energy over one physical revolution of the wheel bearing the tyre casing. As a result, an energetic invariable connected with the deformation of the tyre casing subjected to a load under running conditions is identified. Of course, the method requires just one revolution of the wheel. However, as a preference, the number of revolutions of the wheel will be at least 5, or even 10 so that the results can be averaged as this will make it possible to overcome unpredictable phenomena in the signal such as, for example, obstacles on the roadway over which the tyre casing is running. Thus, in an industrial mode, the precision of the method is thereby improved.

As a preference, the deformation of the tyre casing, which casing is subjected to a load, is determined using the following formula:

$$Def_\% = \frac{(S)}{(N^{TdR} * \gamma^{Reference})} \quad \text{[Math 1]}$$

This then is an elementary formula for the deformation of the tyre casing which can be applied either to $S^+$ or to $S^-$. $S^-$ has to correspond to the energy density calculated from material points on the development of the tyre which, at a precise moment in time T, include those in the contact patch or in the immediate vicinity thereof. Specifically, these points have an absolute acceleration close to zero when passing through the contact patch, and so they must be below the threshold value A. By default, the energy density $S^+$ corresponds to the energy density of the other points on the development of the tyre and notably those outside the contact patch. When the reference acceleration $\gamma^{reference}$ from which the energy densities $S^+$ and $S^-$ are calculated is equal to the mean value of the wheel revolution signal $Sig^{TdR}$, the deformation evaluated using $S^+$ or $S^-$ yields the same result, give or take the measurement uncertainties. That demonstrates that there is an invariable connected with the deformation of the tyre casing subjected to a load Z. In instances in which it is only $S^+$ that is used, there is no need to have a high spatial discretization because the variations outside of the contact patch are not as significant. The advantage of this is that of reducing the necessary sampling frequency of the electronic device coupled to the sensor or of being able to obtain precise information as to the deformation of the tyre casing at high rotational speeds.

Highly preferably, the deformation of the tyre casing, which casing is subjected to a load, is determined using the following formula:

$$Def_\% = \frac{(S^+ + S^-)}{(2 * N^{TdR} * \gamma^{Reference})} \quad \text{[Math 2]}$$

In that case, the tyre deformation energy needs to be summed around the entire development of the tyre. In order to be certain of minimizing measurement uncertainties, use is then made of the set of measurement points for measuring the acceleration normal to the crown in order to determine the deformation of the tyre casing, something that makes it possible to reduce the energy consumption by comparison with an analysis employing a high sampling frequency.

According to a favoured embodiment, the delimitation of the first signal over a number $N^{TdR}$ of wheel revolutions is achieved by the first signal crossing below or above a threshold value less than or equal to half the value of the reference acceleration $\gamma^{reference}$.

In this embodiment, only the first signal is used to delimit this over a whole number of wheel revolutions. Specifically, the signal of the acceleration in the radial direction of a tyre casing subjected to a load will necessarily tend towards zero as the sensor passes through the contact patch if the Earth's gravity signal is neglected as for high rotational speeds. Thus, the first signal will have to pass through a threshold, value that is situated below at least half of the reference acceleration $\gamma^{reference}$. In fact the first signal will pass through this threshold value twice per revolution of the wheel. These passes schematically correspond to the regions of entering and exiting the contact patch. As a result, by considering only one of the directions of crossing, crossing below this threshold or crossing above this threshold, the first signal from the sensor becomes a wheel revolution indicator. Because of the coarse spatial discretization that can be employed, this detection is good enough for the method for evaluating the deformation of the tyre casing.

Advantageously, the threshold value A is a function of the reference acceleration $\gamma^{reference}$.

The threshold value A makes it possible to discriminate between the positive and negative energy densities of the method.

Specifically, any measurement signal has associated noise. It is possible to filter or smooth this signal in realtime, but at the risk of losing information, particularly regarding the dynamics of the passage through the contact patch. By definition, this noise has a substantially zero mean value. Furthermore, while, in theory, it should have little or no effect on the calculation of the energy densities $S^+$ and $S^-$, it is liable to disturb the classification between $S^+$ and $S^-$, and therefore to falsify the end result. The purpose of this threshold value A is to allow the variations between the wheel revolution signal and the reference acceleration to be allocated to one or other of the energy densities, taking account of the variations in the wheel revolution signal that are due to disturbing influences and to a poor signal/noise ratio, it being possible for these disturbing influences to be the result of the macroroughness of the road, of isolated obstacles encountered on the road, of vibrations inherent to the tyre or to the vehicle on which it is mounted, or of small electromagnetic malfunctions of the measurement sequence which are inherent to the nature and quality of the electronic components used. Because the wheel revolution signal and the reference acceleration are dependent on the rotational speed W of the wheel-tyre assembly and on the radial position of the sensor, it would seem judicious to make the threshold value A dependent on the reference acceleration in order to get around these disturbing influences which could adversely affect the desired precision.

Highly advantageously, the threshold value A is a function of a factor C according to the following formula:

$$A = C * \gamma^{Reference}$$ [Math 3].

As a preference, the factor C is greater than or equal to 0.5 and less than or equal to 0.9.

This value for the factor C makes it possible at the same time to discriminate positive and negative energy densities in the wheel revolution signal. Specifically, on entering the contact patch, the wheel revolution signal tends toward zero. In addition, the transition on entering and exiting the contact patch is very pronounced, very rapid, and always has substantially the same profile. Thus, a value of 0.5 means that the number of measurement points that will be assigned to the negative energy density $S^-$ will not be decreased too greatly, or those assigned to $S^+$ will not be increased too greatly. Specifically, the objective of the method is to employ a spatial discretization that is not very high. In general, very few measurement points are situated in the transition zone. As a result, the error on whether a value belongs to $S^-$ or to $S^+$ is minimal, if not to say zero, if no measurement point lies in the selection zone corresponding to C between 0.5 and 0.9. It will also be repeatable if use is made of a coefficient C that is fixed and proportional to reference for all characterizations, and any error that may be induced will be repeatable and therefore transparent as compared with a reference level defined elsewhere.

Conversely, a C value equal to 1.0 is the theoretical value that allows the points to be discriminated between the two possible energy densities. While this is ideal on smooth ground with optimal conditions that minimize disturbing influences in the measurement sequence, the slightest disturbance may have an impact on the precision required for the result.

As a preference, the acquisition of the first signal is performed for a rotational speed W greater than or equal to a threshold rotational speed $W_{seuil}$ defined by the following formula:

$$W_{seuil} = \frac{12}{\sqrt{Dev}}$$ [Math 6]

where Dev is the development of the tyre casing.

Thus, if the running speed is above the threshold value, it is easy to dissociate the wheel revolution signal from the threshold value A and to do so whatever the unforeseeable variations in the wheel revolution signal such as, for example, a high level of macroroughness of the roadway, electromagnetic interference in the measurement sequence, vibrations in the tyre casing. In addition, that also allows the signal due to gravity to be identified more cleanly in the wheel revolution signal.

According to a first embodiment, the determination of the reference acceleration $\gamma^{reference}$ is obtained using the following formula:

$$\gamma^{Reference} = R * W^2$$ [Math 3].

The reference acceleration $\gamma^{reference}$ corresponds to a neutral state of the tyre casing for which the loading is zero. In practice, this manifests itself in the form of a wheel-tyre assembly in which the wheel-tyre assembly runs along the ground without deforming so as to constitute a contact patch. Finally, it corresponds to the acceleration that the sensor would experience if it were mounted on the tyre casing with the latter rotating freely about its natural axis of rotation.

As a result, the reference acceleration $\gamma^{reference}$ is therefore simply the centrifugal acceleration experienced by the sensor mounted on the tyre casing rotating freely. Identifying the reference acceleration therefore entails determining two parameters: the radial position of the sensor with respect to the natural axis of rotation, and the rotational speed W of the tyre casing to which the sensor is attached.

According to a second embodiment, the determination of the reference acceleration $\gamma^{reference}$ is defined by the mean value of the wheel revolution signal $Sig^{TdR}$.

Specifically, in the event of an absence of information regarding the deformation of the tyre casing in an inflated mounted state such that the radial position of the sensor on the tyre casing cannot be identified exactly, it is possible to determine the reference acceleration using the mean value of the wheel revolution signal $Sig^{TdR}$.

Specifically, the method estimates that, in its state of free rotation at the rotational speed W, the tyre casing or any sensor attached thereto, experiences a centrifugal acceleration that is proportional to its radial position with respect to the natural axis of rotation. In addition, when placed under load by the compressing of the tyre casing against firm ground, the tyre casing deforms in such a way as to distribute the energy of defamation generated by this load between two situations. The first situation corresponds to the condition of movement imposed at the contact patch, which has a tendency to reduce the centrifugal energy. The other situation corresponds to the condition of energy imposed on the tyre casing outside of the contact patch. The imposed energy is therefore the compliment of the reduction in centrifugal energy corresponding to the first situation. As a result, the mean value of the wheel revolution signal, over a whole number of revolutions of the wheel, whether or not the tyre casing is subjected to a load Z, corresponds to the centrifugal acceleration experienced by the sensor.

As a preference, having phased the wheel revolution signal $Sig^{TdR}$ with respect to an angular position of the tyre casing, a correction Corr is made to the wheel revolution signal $Sig^{TdR}$ to take account of the effect of the Earth's gravity.

The correction for the Earth's gravity means that the error on the deformation of the tyre casing can be minimized, particularly for low running speeds W. Specifically, the sensor, when the tyre casing is running, makes one revolution about the natural axis of rotation. Because the output signal from the sensor is proportional to the radial acceleration, it will be tainted by the Earth's gravity. Over one revolution of the wheel, the Earth's gravity will generate a sinusoidal signal of amplitude g which is a function of the altitude of the sensor within the Earth frame of reference. This parasitic signal Corr therefore needs to be removed from the wheel revolution signal $Sig^{TdR}$, which means recalibrating the wheel revolution signal with reference to an angular position of the tyre casing.

Of course, the higher the rotational speed W of the tyre casing, the more the centrifugal acceleration experienced by the sensor becomes predominant over this parasitic signal.

According to a first embodiment, the energy densities that are negative $S^-$ and positive $S^+$ are defined according to the following formulae:

$$S^+ = |\int_{SigTdR>A}^U (Sig^{TdR} - \gamma^{Reference}) * du| \quad \text{[Math 5a]; and}$$

$$S^- = |\int_{SigTdR \leq A}^U (Sig^{TdR} - \gamma^{Reference}) * du| \quad \text{[Math 5b]};$$

where u is the abscissa value of the wheel revolution signal $Sig^{TdR}$.

Thus, in the case of a continuous signal, the energy densities $S^+$ and $S^-$ are determined using the above formulae.

According to one particular embodiment, the acquisition of the first signal is performed at a constant sampling frequency and the spatial discretization of the sampling of the first signal is less than 6 degrees, preferably less than 3 degrees, and very preferably less than 1 degree.

For example, if the desire is for the deformation of the tyre casing to be evaluated in the wheel-tyre assembly, then the sensor needs to be associated with an electronic member comprising a microcontroller, a memory space, a battery and a clock. The spatial discretization envisaged with a constant sampling frequency then allows elementary operations to be performed in the microcontroller, minimizing battery consumption. In addition, the minimal discretization of the order of 60 points per revolution of the wheel makes it possible to limit the number of operations and transfers to the memory space. Even so, the precision obtained on the deformation of the tyre casing is good, while at the same time having saved on electronic member battery power. That means that only intermediate scalar values of the method need be stored or transferred.

According to one very particular embodiment, the energy densities that are negative $S^-$ and positive $S^+$ are determined using the following formulae:

$$S^+ = |\Sigma_{SigTdR>A}(Sig^{TdR} - \gamma^{Reference})| * \frac{N^{TdR}}{N^U} ; \text{ and} \quad \text{[Math 7a]}$$

$$S^- = |\Sigma_{SigTdR \leq A}(Sig^{TdR} - \gamma^{Reference})| * \frac{N^{TdR}}{N^U} ; \quad \text{[Math 7b]}$$

where $N^U$ is the total number of points discretized in the wheel revolution signal $Sig^{TdR}$.

This is a simple way of obtaining a scalar value for each energy density from the discretized signal of the wheel revolution signal.

According to a very particular embodiment, the reference acceleration $\gamma^{reference}$ is defined using the following formula:

$$\gamma^{reference} = \frac{(\Sigma_{SigTdR} Sig^{TdR})}{N^U} ; \quad \text{[Math 8]}$$

where $N^U$ is the total number of points discretized in the wheel revolution signal $Sig^{TdR}$.

When the evaluation of the reference acceleration $\gamma^{reference}$ is evaluated as the mean value of the wheel revolution signal over a finite number of revolutions of the wheel, this is a simple and rapid way of obtaining an evaluation of the scalar quantity.

According to one preferred embodiment, the deformation of the tyre casing, which casing is subjected to a load, is determined using the following formula:

$$Def_\% = \frac{|\Sigma_{SigTdR>A}(Sig^{TdR} - \gamma^{Reference})|}{(\Sigma_{SigTdR} Sig^{TdR})} ; \text{ or} \quad \text{[Math 9a]}$$

$$Def_\% = \frac{|\Sigma_{SigTdR \leq A}(Sig^{TdR} - \gamma^{Reference})|}{(\Sigma_{SigTdR} Sig^{TdR})} ; \text{ or} \quad \text{[Math 9b]}$$

$$Def_\% = \frac{|\Sigma_{SigTdR>A}(Sig^{TdR} - \gamma^{Reference})| + |\Sigma_{SigTdR \leq A}(Sig^{TdR} - \gamma^{Reference})|}{(2 * (\Sigma_{SigTdR} Sig^{TdR}))}. \quad \text{[Math 9c]}$$

Furthermore, by opting to evaluate the reference acceleration $\gamma^{reference}$ in the form of the mean value of the wheel revolution signal, a measurement performed by that same sensor advantageously appears in both the numerator and the denominator of the formula for calculating Def %, which means that the result will be insensitive to any drifting of the characteristics of this sensor as a result of external influences.

This is the simplest and most elementary form in which to identify the deformation of the tyre casing from the discretized quantities from the wheel revolution signal. The three formulae are theoretically equivalent except for the errors generated by the discretization of the wheel revolution signal.

BRIEF DESCRIPTION OF THE DRAWINGS

The invention will be better understood on reading the following description, which relates to the case of application to pneumatic tyres. This application is given solely by way of example and made with reference to the attached figures in which.

DETAILED DESCRIPTION OF EMBODIMENTS

In order to implement the invention, a tyre casing has to be equipped with an electronic member comprising a sensor, a microcontroller, a clock, a memory space and an energy storage means, and radio frequency communications means capable of transmitting and possibly of receiving. The tyre casing comprises a crown, two sidewalls and two beads of revolution about a natural axis of rotation. The casing also comprises a median plane equidistant from the two beads, the intersection between the median plane and the natural axis of rotation defining a wheel centre.

The sensor is fixed to the tyre casing in line with the crown, in line with a rib or with a longitudinal groove which are regions of uniform stiffness, at a radial position R that is fixed with respect to the natural axis of rotation. The sensor is able to generate at least one output signal proportional to the acceleration normal to the crown that is experienced by the sensor inside the tyre casing. In fact, this sensor may be a single-axis sensor, in which case it needs to be positioned radially. It may also be made up of a plurality of single-axis sensors. In that case, the orientation of each of the single-axis sensors needs to be clearly identified with respect to the frame of reference of the tyre casing so as to reconstruct the acceleration normal to the crown of the tyre casing. Ideally, the sensor takes account of the continuous component and of the alternating component of the acceleration. In instances where only the alternating component is measured by the sensor, implementation of the method will require the continuous component to be constructed artificially. To do that, the rotational speed W of the tyre casing will need to be identified in real-time and the radial position R of the sensor will need to be precisely known. This is because the continuous component will be evaluated as being the centrifugal acceleration of the sensor with respect to the natural axis of rotation of the tyre casing. If the sensor takes account of the continuous component, this sensor may be an accelerometer using piezo-resistive or capacitive technology.

The electronic member is powered by the energy storage means, is controlled by the microcontroller with the aid of the clock, and also has implanted in it the calculation algorithms that make it possible for example to determine the state of deformation of the tyre by using the signals coming from the sensor element. The RF communications transmission means are used to transmit the calculated information and the reception means are used to receive operating instructions or information of use to the calculation algorithms. Ideally, this electronic member comprises or is associated with other measurement elements (measuring for example pressure, temperature, state of wear, distance travelled, etc.) so that components can be shared and operating costs optimized.

In this instance, the sensor is brought into operation by the microcontroller when the tyre casing is in a running condition. Of course, a threshold value for the rotational speed W beyond which acquisition of a sensor output signal is performed can be selected. The electronic member has a memory space suited to the type of analysis that is to be performed. In fact, the capacity of this memory space is predefined according to the use made of the electronic member. It is the microcontroller that controls the storage of the values from the sensor in the memory space. In addition, the microcontroller is able to perform elementary mathematical and logic operations on a reduced number of data. If the mathematical and logic operations are more complex, or if the number of data to be manipulated becomes great, the microcontroller is replaced by a microprocessor. Finally, the electronic member is powered by a storage means. The simplest storage means is the use of a battery. However, it is possible to envisage a large sized capacitor that can be recharged using a piezoelectric element.

The frequency range of the electronic member is able to cover a broad range of rotational speeds W with a spatial discretization of under 6 degrees. According to one particular embodiment, the sampling frequency is adaptive on demand or in response to a signal such as, for example, the rotational speed W of the tyre casing.

Optionally, the electronic member contains or is able to obtain the identification of the tyre casing. This information is useful for selecting a set of data that are useful for the calculation algorithms in the electronic member. If the electronic member needs to obtain the identification of the tyre or receive orders to take a measurement, the electronic member is equipped with a radiofrequency reception means. This operates in the low frequency range, ideally at the frequency of 125 kHz, so as to be free of the interference generated by the metallic regions of the tyre casing and its nearby environment in the vehicle.

According to one specific embodiment, the electronic member has radiofrequency transmission means, specifically in the UHF (ultra-high frequency) band, and particularly around 433 MHz or 900 MHz or what is known as the BLE (Bluetooth Low Emission) band which are free frequency bands. In addition, the UHF band makes it possible to have small antenna sizes making the electronic member easier to incorporate into the tyre casing.

This transmission communication is useful for transmitting the method data to the vehicle or to outside the vehicle. It is possible either to transmit the data string corresponding to the acquisition of the wheel revolution signal or to transmit the intermediate results that will have been calculated in the electronic member. This second transmission mode is necessarily less expensive in energy for the electronic member because the data stream is less intensive. Now, radiofrequency transmission consumes more energy than mathematical and logic operations.

Figure 1:
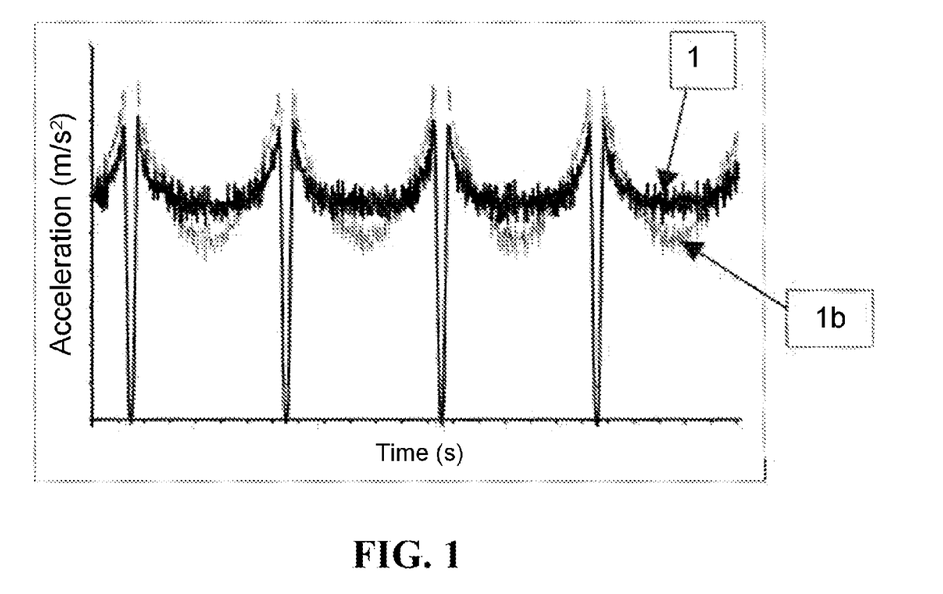
FIG. 1 is an example of a first signal of the method.

FIG. 1 shows a first raw signal $1b$ in grey corresponding to the acceleration normal to the crown of a tyre casing of the heavy duty vehicle type running at a constant rotational speed W. Regularly, and periodically, the curve $1b$ passes through a near-zero value. This periodic phenomenon corresponds to the sensor passing through the contact patch of the tyre casing. The transition between the sensor passing through the contact patch of the tyre and the other part of the tyre casing occurs sharply at falling or rising fronts depending on whether the sensor is entering or leaving the contact patch. In addition, it will be noted that the first signal $1b$ on a scale of the order of one revolution of the wheel, follows a carrier wave, the first signal $1b$ oscillating about this carrier wave at a frequency higher than the frequency of revolution of the wheel. These oscillations correspond to the noise on the first signal $1b$ from the sensor, which noise is caused by the various unpredictable influences including the macroroughness of the road.

The curve indexed 1 in black represents the same accelerometer signal corrected only for the Earth's gravity, and which will be termed corrected first signal 1. The correction here is sinusoidal with the correction having being phased to a point situated at the centre of the contact patch, namely equal distances from the two wave fronts that delimit that part of the signal for which the value is near-zero. It may be seen that the first signal 1 is flatter between the regions characterizing the contact patch. It is preferable for the various steps of the method to be performed on this corrected first signal 1.

Figure 2:
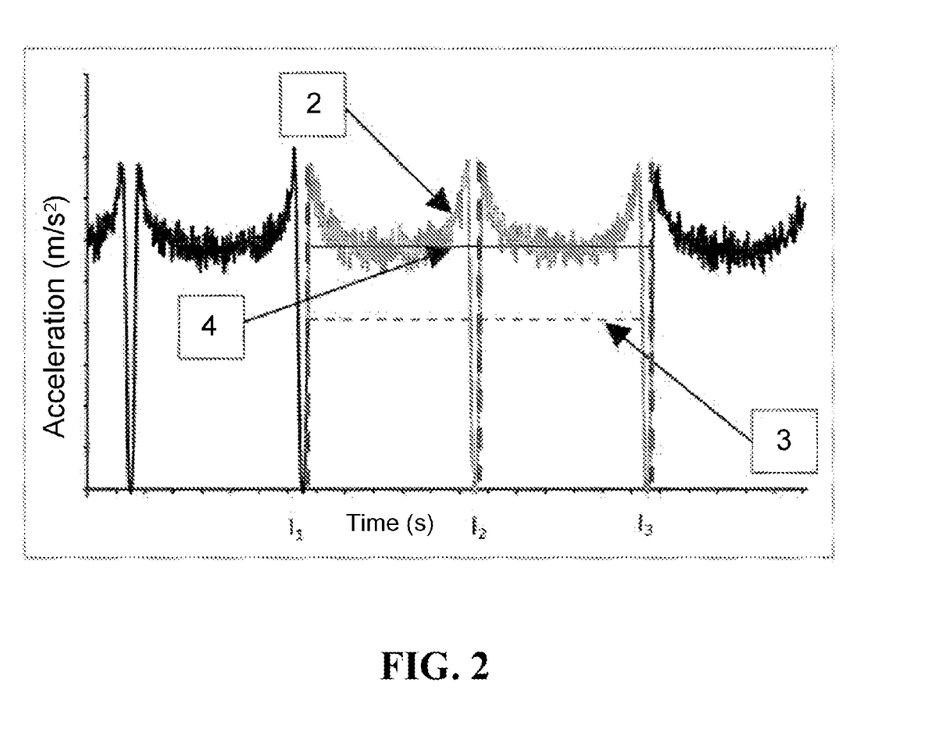
FIG. 2 shows the wheel revolution signal $Sig^{TdR}$ and how it is identified from a first signal.

FIG. 2 shows the method for detecting the wheel revolution signal 2. From the first signal 1, in this instance corrected in order to explain the example better, there is determined a threshold value E, illustrated by the dotted line 3. A series of increments I is identified, these being where the first signal 1 crosses the dotted line 3, for example from beneath, which physically corresponds to the sensor, securely connected in terms of rotation to the tyre casing, exiting the contact patch. The first wheel revolution signal 2 is then delimited as being between a first increment, in this instance Ii, and a second increment, in this instance 13. The wheel revolution signal here represents the accelerometer signal from the sensor over two full revolutions of the wheel.

The threshold value E represented by the dotted line 3 has in this case been evaluated over part of the first signal 1 with a variable sampling frequency. The maximum discretized value obtained is extracted from this part of the first signal 1 and named MAX. The threshold value E is therefore a value comprised between 10 and 50% of the value MAX, and in this instance, this value is around 50%.

The reference acceleration $\gamma^{reference}$, which is represented by the continuous line 4 in black, is calculated as being the mean value of the wheel revolution signal 2. It is evaluated in real-time by summing the values of the increments u of the first wheel revolution signal and then dividing, at the end of the wheel revolution signal, by the number of increments in the first wheel revolution signal. Of course, the calculation can also be done after the complete recording of the wheel revolution signal 2 has been recorded and stored in memory.

Figure 3:
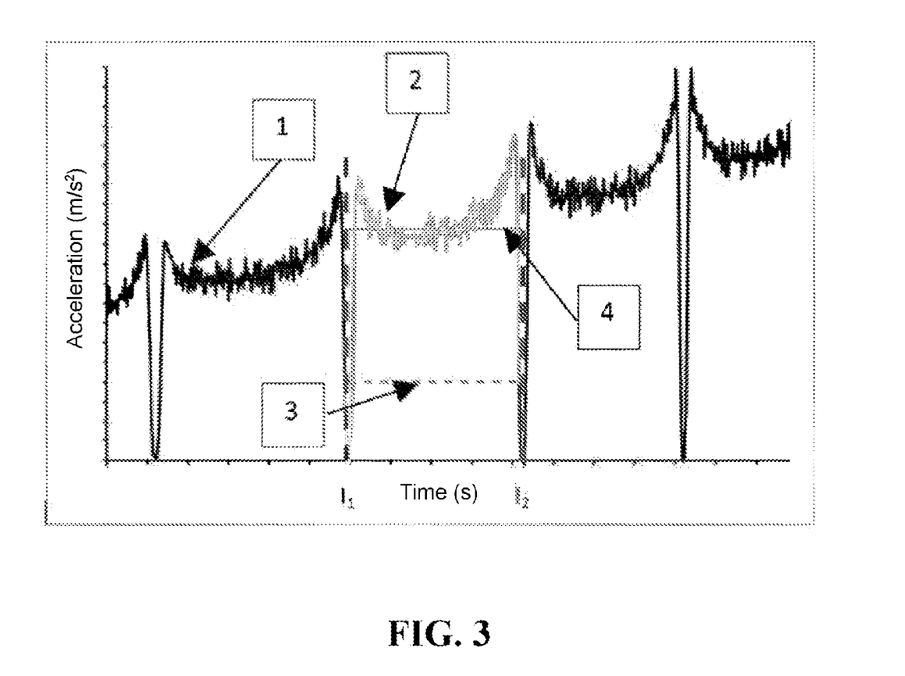
FIG. 3 shows the wheel revolution signal $Sig^{TdR}$ when running at a variable rotational speed W.

FIG. 3 shows a first signal 1, previously corrected for the Earth's gravity and corresponding to the acceleration normal to the crown of a tyre casing of the heavy duty vehicle type running at a variable rotational speed W.

Here are determined threshold values E, represented by the dotted line 3, for the wheel revolution signal 2 in pale grey.

The first threshold value E makes it possible to identify the increments I corresponding, for example, to the sensor leaving the contact patch. In this analysis, the wheel revolution signal $Sig^{TdR}$ is limited to one revolution of the wheel, as this is preferable in order to limit the errors associated with the variation in the rotational speed W of the tyre casing. The threshold value E has been chosen so that it corresponds to half the reference acceleration of the first signal delimited over a whole number of wheel revolutions performed before the wheel revolution signal 2. The reference acceleration $\gamma^{reference}$ is also calculated, on this wheel revolution signal 2, as being the mean value of the wheel revolution signal 2, represented by the continuous curve 4.

It will also be noted that, because the rotational speed W is variable here in the acceleration phase, the period associated with the revolution of the wheel decreases, resulting in increasingly closely-spaced rising wave fronts or falling wave fronts.

Figure 4:
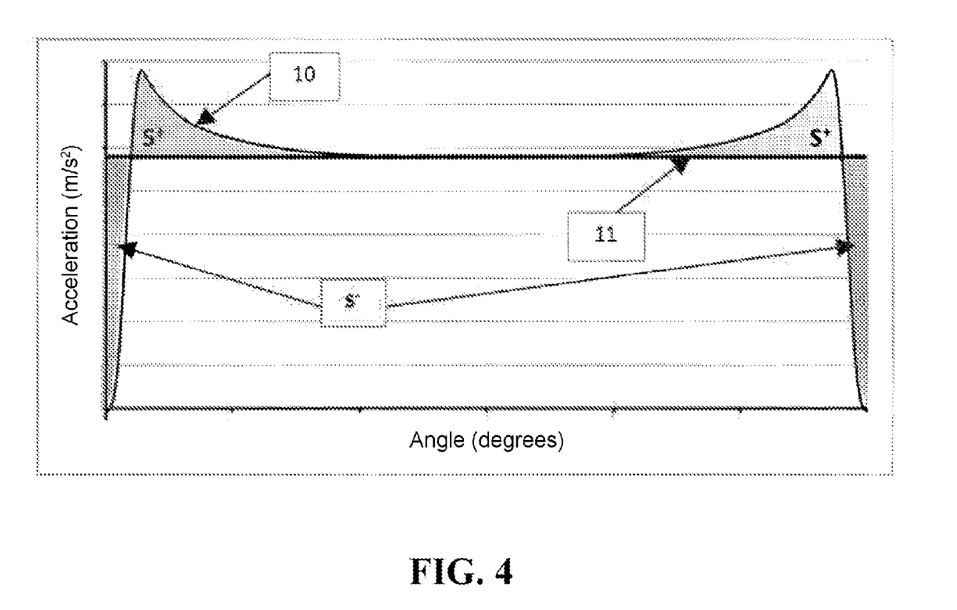
FIG. 4 shows the second wheel revolution signal $Sig^{TdR2}$ when running at a rotational speed W that remains constant over a revolution.

FIG. 4 is an illustration to explain the calculation of the energy densities that are positive $S^+$ and negative $S^-$ on a wheel revolution signal 10 corresponding to a single revolution of the wheel when the rotational speed W is constant. Of course, the method is the same if the rotational speed W is variable or if the wheel revolution signal is delimited over several revolutions of the wheel.

The threshold value A is determined here as being the product of a value C, in this instance equal to 1.0, times the reference acceleration $\gamma^{reference}$ identified on the wheel revolution signal as post-processing of the acquisition of the wheel revolution signal. This threshold value is embodied by the continuous line 11. In fact, it is preferable on real signals, to adopt a value equal to 0.7 for C. If there is a lot of interference on the signals, then a C-value equal to 0.5 or 0.6 may be chosen. By contrast, for signals obtained on road surfaces that are smooth overall, a C-value of the order of 0.8 or 0.9 may be employed. This C-value needs to be fixed for all the steps of the method.

The positive energy densities $S^+$ or negative energy densities $S^-$ are calculated as the sum of the absolute values of the differences between the wheel revolution signal 10 and the reference acceleration $\gamma^{reference}$ represented by the continuous curve 11. The area delimited by the areas $S^+$ has to be equal to the area delimited by the area S.

The invention claimed is:

1. A method for obtaining the deformation of a tire casing subjected to a load, in an inflated and laden state rotating at a rotational speed W, the tire casing having a crown, two sidewalls and two beads of revolution about a natural axis of rotation and a median plane, an intersection between the median plane and the natural axis of rotation defining a wheel center, the method comprising the following steps:

fixing at least one sensor on the tire casing in line with the crown at a radial position R with respect to the natural axis of rotation, the sensor being configured to generate at least one output signal proportional to acceleration experienced by the sensor in the tire casing;

acquiring a first signal comprising at least the amplitude of the acceleration in a direction normal to the crown when running at the rotational speed W;

delimiting the first signal over a number $N^{TdR}$ of wheel revolutions, $N^{TdR}$ being greater than or equal to 1, so as to construct a wheel revolution signal;

determining a reference acceleration $\gamma^{reference}$ that is a function of the rotational speed W and of the position of the at least one sensor;

defining a first energy density S which is a function of the wheel revolution signal, and of the reference acceleration $\gamma^{reference}$, and which is denoted $S^+$ when the wheel revolution signal is above a threshold value A, or is denoted $S^-$ when the wheel revolution signal is below or equal to the threshold value A; and identifying the deformation of the tire casing, which deformation is generated by the load as a function of the reference acceleration $\gamma^{reference}$ and of the first energy density S which are associated with a position of the at least one sensor.

2. The method according to claim 1, wherein the identification of the deformation of the tire casing subjected to a load is determined using the following formula:

$$Def_\% = \frac{(S)}{(N^{TdR} * \gamma^{Reference})}. \quad \text{[Math 1]}$$

3. The method according to claim 1, wherein the identification of the deformation of the tire casing subjected to a load is determined using the following formula:

$$Def_\% = \frac{(S^+ + S^-)}{(2 * N^{TdR} * \gamma^{Reference})}. \quad \text{[Math 2]}$$

4. The method according to claim 1, wherein the delimitation of the first signal over a number $N^{TdR}$ of wheel revolutions is achieved by the first signal crossing below or above a threshold value less than or equal to half the value of the reference acceleration $\gamma^{reference}$.

5. The method according to claim 1, wherein the threshold value A for defining the first energy density is a function of the reference acceleration $\gamma^{reference}$.

6. The method according to claim 1, wherein the threshold value A for defining the first energy density is a function of a factor C, the factor C being greater than or equal to 0.5 and less than or equal to 0.9, using the following formula:

$$A = C * \gamma^{Reference} \quad \text{[Math 3]}.$$

7. The method according to claim 1, wherein the determination of the reference acceleration $\gamma^{reference}$ is defined using the following formula:

$$\gamma\text{reference} = R * W_2 \quad \text{[Math 4]}.$$

8. The method according to claim 1, wherein the determination of the reference acceleration $\gamma^{reference}$ is defined as a mean value for the wheel revolution signal $Sig^{TdR}$.

9. The method according to claim 1, further comprising the step of, having phased the wheel revolution signal $Sig^{TdR}$ with respect to an angular position of the tire casing, making a correction Corr to the wheel revolution signal $Sig^{TdR}$ to take account of the effect of the Earth's gravity.

10. The method according to claim 1, wherein the energy densities that are negative $S^-$ and positive $S^+$ are defined according to the following formulae:

$$S^+ = |\int_{SigTdR>A}^{U}(Sig^{TdR}-\gamma^{Reference})*du| \quad \text{[Math 5a]; and}$$

$$S^- = |\int_{SigTdR\leq A}^{U}(Sig^{TdR}-\gamma^{Reference})*du| \quad \text{[Math 5b]};$$

where u is an abscissa value of the wheel revolution signal $Sig^{TdR}$.

11. The method according to claim 1, wherein the acquisition of the first signal is performed for a rotational speed W greater than or equal to a threshold rotational speed $W_{seuil}$ defined by the following formula:

$$W_{seuil} = \frac{12}{\sqrt{Dev}}, \quad \text{[Math 6]}$$

where Dev is the development of the tire casing.

12. The method according to claim 1, wherein the acquisition of the first signal is performed at a constant sampling frequency and a spatial discretization of the sampling of the first signal is less than 6 degrees.

13. The method according to claim 12, wherein the energy densities that are negative $S^-$ and positive $S^+$ are defined according to the following formulae:

$$S^+ = \left|\Sigma_{SigTdR>A}(Sig^{TdR} - \gamma^{Reference})\right| * \frac{N^{TdR}}{N^U}; \text{ and} \quad \text{[Math 7a]}$$

$$S^- = \left|\Sigma_{SigTdR\leq A}(Sig^{TdR} - \gamma^{Reference})\right| * \frac{N^{TdR}}{N^U}, \quad \text{[Math 7b]}$$

where $N^U$ is the total number of points discretized in the wheel revolution signal $Sig^{TdR}$.

14. The method according to claim 12, wherein the determination of the reference acceleration $\gamma^{reference}$ is defined using the following formula:

$$\gamma^{reference} = \frac{(\Sigma_{SigTdR} Sig^{TdR})}{N^U}, \quad \text{[Math 8]}$$

where $N^U$ is the total number of points discretized in the wheel revolution signal $Sig^{TdR}$.

15. The method according to claim 12, wherein the energy densities that are negative $S^-$ and positive $S^+$ are defined according to the following formulae:

$$S^+ = \left|\Sigma_{SigTdR>A}(Sig^{TdR} - \gamma^{Reference})\right| * \frac{N^{TdR}}{N^U}; \text{ and} \quad \text{[Math 7a]}$$

$$S^- = \left|\Sigma_{SigTdR\leq A}(Sig^{TdR} - \gamma^{Reference})\right| * \frac{N^{TdR}}{N^U}, \quad \text{[Math 7b]}$$

wherein the determination of the reference acceleration $\gamma^{reference}$ is defined using the following formula:

$$\gamma^{reference} = \frac{(\Sigma_{SigTdR} Sig^{TdR})}{N^U}, \quad \text{[Math 8]}$$

where $N^U$ is the total number of points discretized in the wheel revolution signal $Sig^{TdR}$; and wherein the identification of the deformation of the tire casing subjected to a load is determined using the following formulae:

$$Def_\% = \frac{\left|\Sigma_{SigTdR>A}(Sig^{TdR} - \gamma^{Reference})\right|}{(\Sigma_{SigTdR} Sig^{TdR})}; \text{ or} \quad \text{[Math 9a]}$$

$$Def_\% = \frac{\left|\Sigma_{SigTdR\leq A}(Sig^{TdR} - \gamma^{Reference})\right|}{(\Sigma_{SigTdR} Sig^{TdR})}; \text{ or} \quad \text{[Math 9b]}$$

$$Def_\% = \frac{\left|\Sigma_{SigTdR>A}(Sig^{TdR} - \gamma^{Reference})\right| + \left|\Sigma_{SigTdR\leq A}(Sig^{TdR} - \gamma^{Reference})\right|}{(2*(\Sigma_{SigTdR} Sig^{TdR}))}. \quad \text{[Math 9c]}$$

* * * * *